United States Patent Office 2,787,632
Patented Apr. 2, 1957

2,787,632
POLYCARBONATES

Henry C. Stevens, Akron, Ohio, assignor to Columbia-Southern Chemical Corporation, Allegheny County, Pa., a corporation of Delaware No Drawing. Application July 7, 1954,
Serial No. 441,928

11 Claims. (Cl. 260—463)

The instant invention relates to linear, low molecular weight polycarbonates, especially linear polycarbonates possessing terminal hydroxyl groups and averaging between 800 and 4000 or 5000 in molecular weight. More particularly, it is concerned with novel ester-interchange processes for the efficient preparation of such polycarbonates.

According to this invention superior and valuable linear polycarbonates having terminal hydroxyl groups are manufactured by controlled ester-interchange between a diester of carbonic acid and a saturated, acyclic diol. Now it has been discovered that the ratio of the diol to diester in the reaction medium during the course of the ester-interchange reaction influences the quality and utility of the resulting polycarbonate. In this regard, it has been found that especially useful linear polycarbonates are obtained by conducting ester-interchange in a medium which contains an essentially constant ratio of diol to carbonate diester while also withdrawing the by-product alcohol evolved as a result of the reaction.

This invention, therefore, involves conducting ester-interchange between a saturated, acyclic diol and a diester of carbonic acid by first establishing a reaction medium containing a predetermined ratio of diol and diester, subjecting such medium to conditions conducive to the formation of linear polycarbonates, withdrawing the alcohol evolved as a result of the ester-interchange and maintaining the predetermined ratio of reactants in the reaction medium essentially constant throughout most, or all, of the reaction period. Metallic sodium or comparable catalyst is usually incorporated in the reaction medium. Also, the temperature of the reaction medium is raised to between about 140° C. and about 200° C.

In practice, for example, the contemplated process is conducted by charging a reaction vessel, e. g. a steam-jacketed kettle, with a mixture containing both reactants and a minor quantity of appropriate catalyst, typically about 0.005 percent catalyst by weight of the charge. The mixture should contain a slight excess of diol; thus, between about 1.05 and 1.15 or more, moles of saturated, acyclic diol per mole of carbonate diester are present. Thereafter, the charge is heated, normally in a gradual manner, until a maximum temperature of at least 140° C. and often as high as about 200° C. is attained. For this purpose, steam may be introduced into the jacket or other external heating expedients are adequate.

The ester-interchange reaction initiates quite rapidly and evolution of by-product alcohol occurs with ease. In the early stages of the reaction only moderate heating and temperatures of up to about 100° C. are necessary. However, as the reaction proceeds and higher conversions are sought, the temperature is raised to at least about 140° C., and often as high as about 200° C. or possibly 220° C. The maximum temperature within this range is often dictated by various considerations hereinafter explained in more detail.

As the reaction proceeds and polycarbonate is formed, by-product alcohol is evolved. According to this invention, this alcohol is removed from the reaction medium, preferably essentially as rapidly as it is generated. This facilitates high conversions and/or the preparation of the desired linear polycarbonates.

Various expedients may be employed to effect removal of the evolved alcohol. At the contemplated reaction temperatures, this alcohol is withdrawn by removing the vapors present in the reaction vessel. In one expedient, simple evacuation means such as provided by application of a vacuum to the liquid-gas interface of the liquid reaction medium suffices. Usually, vacuum is not necessary to withdraw the evolved alcohol as the reaction commences, but successful withdrawal of the alcohol during the latter stages of the reaction is achieved by application of a vacuum. In practice, a gradually increasing vacuum is applied, often subatmospheric pressures as low as 10 to 25 millimeters of mercury being finally used.

Admixed with the evolved alcohol which is volatilized and removed are quantities of the reactants, notably of the carbonic acid diester. Sufficient quantities of the diester are removed in this manner to disrupt the balance between the diol and diester remaining in the reaction medium. In accordance with this invention, the liquid reaction medium is replenished with a quantity of diester which is equivalent to that admixed with the evolved alcohol, preferably in an instantaneous or continuous manner.

In one embodiment, the gaseous mixture of alcohol and diester, after being withdrawn from the system, is treated to separate the diester, which is returned to the liquid medium. By continuously or semi-continuously conducting such separation and recycle, an essentially constant ratio of reactants may be maintained in the liquid reaction medium. A suggested expedient involves selectively condensing the diester from the gaseous mixture and returning the condensate to the reaction medium. In such selective condensation, best results are obtained when essentially all of the diester is condensed to the substantial exclusion of the alcohol, although slight amounts of condensed alcohol are tolerable.

It will be appreciated that it is not necessary to return the diester which is removed in admixture with the alcohol, but in lieu thereof, appropriate quantities obtained from other sources may be added to the reaction mixture. In such case, the rate of addition of diester is correlated with the diester losses. However, most efficient control of the reactant ratio is achieved by selectively separating the diester and returning it to the medium.

In a preferred procedure, the selective condensation of the diester to the substantial exclusion of the alcohol is achieved by withdrawing the vapors from the reaction system through a packed column maintained at a temperature below the boiling point of the diester and above or at the boiling point of the alcohol. Thus, the gases in passing from the system into the packed tower, or equivalent fractionating apparatus, are cooled to temperatures at which the diester condenses but at which the alcohol remains as a gas. The condensate is returned to the reacting medium by gravity or other technique.

Reaction mediums which contain a slight mole excess of diol make it possible to obtain particularly desirable polycarbonates. Mediums containing between about 1.05 and 1.15 moles of diol per mole of carbonic acid diester are therefore recommended, although even larger excesses of diol are permissible such as up to 1.25 moles of diol per mole of carbonic acid diester. Maintenance of this ratio of diol to carbonate diester throughout at least a major portion of the reaction period is an important feature. By essentially constant ratio is meant a ratio which does not vary more than about 10 percent from the initially established ratio, but in which the mole ratio of diol to diester exceeds unity. A reaction medium which contains between 1.05 and 1.15 moles of diol per mole of carbonate diester throughout the reaction period is essentially constant within the intended meaning.

Control of the reactant ratio is maintained throughout at least a major portion of the reaction period, e. g. at least until about 80 percent of the reaction is consumated. Maintenance of the constant ratio reactant for even lengthier portions of the reaction period has further advantages and is often recommended.

For the most part, the reaction is conducted until a high conversion of the reactants is achieved as when at least 80 percent, and notably when at least 90 to 98 percent of the diester has been consumed. Reaction periods of at least 1 to 2 hours and frequently from 3 to 10 hours are thusly required. Maintaining the ratio of reactants from the beginning and for the major portion of this time, e. g. at least the first 75 percent of the elapsed reaction period, is considered satisfactory. As the reaction progresses, the temperature is gradually raised until an ultimate temperature of between about 140° C. and 200° C. or possibly 220° C. is reached. Within this range, the final temperature to which the medium is raised may determine the nature of the polycarbonate. Thus, in one of the contemplated procedures, the ultimate temperature which is employed has an influence on the molecular weight and hydroxyl number of the polycarbonate. It has been found that the higher the ultimate temperature within this specific range, the higher the average molecular weight of the product and the lower the hydroxyl number. Reference to Table I indicates the effect of temperature on the character of the linear polycarbonate.

Frequently in providing the higher molecular weight, lower hydroxyl number polycarbonates, the reaction medium is brought to and maintained at a temperature in excess of 160° C. or 170° C. for a substantial portion of the total reaction period; e. g. at least 30 minutes and more often for from 1 to 3 hours depending of course on the length of the entire reaction period. With temperatures in excess of 160° C. or 170° C. over such time periods, decomposition to dioxane and carbon dioxide is encountered. This dioxane formation may be avoided or substantially minimized according to an embodiment of this invention while still obtaining comparable polycarbonates by limiting the periods of time at which the reaction medium exceeds such temperatures to less than 10 minutes, notably less than 5 minutes.

Various techniques may be employed to subject the reaction medium to the temperatures above about 160° C. or 170° C. and up to 200° C. for only limited periods of time, usually less than 10 minutes and most frequently for 1 to 5 minutes. One recommended technique is to subject the medium to falling-film distillation at temperatures within the specified range. This permits polycarbonates to be provided which have hydroxyl numbers and average molecular weights which are equivalent to those obtained by subjecting the reaction medium to higher reaction temperatures for periods of up to 1 hour or longer without encountering substantial dioxane formation.

It has further been found that the ester-interchange reaction and consequent polycarbonate formation is effected without complete conversion. Conversions of from 80 percent to 98 percent, mostly between 90 and 98 percent, are usual. Thus, at the conclusion of the reaction period, a medium is present containing unreacted diol, unreacted diester, and the product. Yet, many preferred polycarbonates should contain little or no diol or diester.

Accordingly, another embodiment involves treating the medium present at the conclusion of an ester-interchange reaction in which unconverted reagents are still present. Besides enhancing the quality of the polycarbonate, removal of unreacted reagents permits their recovery and reuse in further reactions. It is usually desirable to remove essentially all of the carbonic acid diester. Diols, depending to a large extent on the specific use to which the polycarbonates is tailored, may be present in varying quantities. Polycarbonates containing less than about 5 to 10 percent diol and more suitably less than 3 percent by weight have been found to be most valuable.

In a preferred technique, purification of such a reaction mixture containing varying but minor quantities of diol and diester is accomplished by removing the reactants under those conditions which insure the presence of diol in the medium so long as any appreciable diester content remains. Thus, the diester should be removed from a medium containing some diol. This may be accomplished by sequentially removing the diester prior to removing all the diol and thereafter consumating the removal of all or a significant portion of the diol.

By selecting a diester of carbonic acid which is more volatile than the diol, it is possible to remove the diester prior to the diol and thereby maintain diol in the medium as long as diester is also present. Generally, the lower aliphatic dialkyl carbonates are more volatile than the contemplated saturated, acyclic diols. When the diester of carbonic acid is more volatile than the diol, as preferred by this invention, the purification and recovery of unreacted reagents may be accomplished by initially selecting conditions which permit the vaporization of the more volatile diester.

The selective vaporization of the diester, in a preferred mode of operation, is effected by heating the diester-containing medium to the maximum temperature reached during the course of ester-interchange, notably up to about 200° C. By so heating and maintaining a vacuum, the more volatile diester of carbonic acid may be volatilized and removed from the system. Although some diol may accompany the volatile diester, a considerable portion will remain behind with the polycarbonate. Once the diester has been substantially removed, further reduction pressure (increasing the vacuum) permits volatilization of the major portion of the diol. This reduction in pressure may be accompanied with increasing temperatures to further facilitate diol removal. For the most part, increased temperatures are employed when the diester has been removed at temperatures below 200° C. Then, in order to effect diol removal, the temperature may be raised to about 200° C.

Should consequential dioxane formation be encountered as a result of the purification, as when using temperatures above 160° C., specialized equipment which enables one to effect the volatilization and removal in periods of less than 10 minutes may be employed. Thus, a continuous topping procedure wherein only small portions of the media are subjected to these elevated temperatures for short time periods permit rapid removal of the volatiles is suitably utilized.

The following examples illustrate the manner in which the present invention may be performed:

EXAMPLE I

Into a 500 cubic centimeter glass, three-necked flask equipped with a thermometer and to which was attached a packed column, 118 grams of diethyl carbonate and 111 grams of diethylene glycol along with 15 milligrams of metallic sodium were charged. The flask was then immersed in an oil bath and heat was gently applied until the temperature of the mixture reached about 120° C., when noticeable evolution of ethyl alcohol commenced.

Byproduct ethyl alcohol was withdrawn through the packed column with any accompanying diethyl carbonate being returned to the flask.

After the initial evolution of ethanol, which occurred at approximately 120° C., heating was continued to maintain this temperature until no evolution of ethanol was observed. Then, the temperature of the oil bath was raised slowly until a maximum oil bath temperature in accordance with the values listed in Table I was attained, whereafter a gradual vacuum was applied to the outlet end of the packed column until no further evolution of alcohol could be observed and a maximum vacuum of about 40 millimeters of mercury pressure was achieved.

After removing the packed column and while maintaining the same temperature as ultimately achieved during the reaction, the pressure was further reduced to about 10 millimeters of mercury. Essentially all of the remaining unreacted diethyl carbonate volatilized and was topped from the reaction mixture. At the conclusion of the diethyl carbonate evolution, the vacuum was further reduced to about 2 to 3 millimeters of mercury pressure to top out unreacted diethylene glycol.

The following table indicates the maximum oil bath temperature employed and the nature of the products:

Table I

| Highest Temp. in Oil Bath, ° C. | Hydroxyl No. | Approximate Average Molecular Weight |
|---|---|---|
| 150 | 94 | 1,000 |
| 165 | 77 | 1,250 |
| 175 | 54 | 1,800 |
| 200 | 35 | 2,800 |

EXAMPLE II

Into a 500 cubic centimeter 3-necked glass flask was placed 315.4 grams (2.1 moles) of triethylene glycol, 236.0 grams (2.0 moles) of diethyl carbonate and 30 milligrams of metallic sodium. A packed column was attached to one of the necks of the flask. The flask was then immersed in an oil bath and gradually heated. When the oil bath was raised to a temperature of about 125° C., evolution of ethyl alcohol commenced.

The evolved alcohol was withdrawn through the packed column with any accompanying diethyl carbonate being returned to the flask. Over a period of about 2½ hours, the temperature of the oil bath was gradually raised until it reached 200° C.

The packed column was removed and a short still-head was fitted in its place. The contents of the flask were then heated to 200° C. With a vacuum of between 3 to 5 millimeters of mercury pressure, unreacted reagents were removed by distillation. Finally, with the temperature of the oil bath at 200° C., the contents of the flask were subjected to a vacuum of 2 millimeters mercury pressure for 20 minutes until no detectible distillate could be observed. The resulting product weighed 317.9 grams and had a hydroxyl number of 73.

EXAMPLE III

Into a 5-liter, three-necked flask a mixture of 2360 grams (20 moles) of diethyl carbonate, 2226 grams (21.0 moles) of diethylene glycol and 0.6 gram of metallic sodium were charged. A packed column having an estimated plate value of about 15 was attached to one neck of the flask. The flask was heated by immersion in an oil bath, the temperature of which was gradually raised to a maximum of 180° C. Until this temperature was reached, by-product ethanol was withdrawn through the column at atmospheric pressure with any accompanying diethyl carbonate being condensed therein and returned to the flask. Thereafter, the alcohol was withdrawn under reduced pressure by applying a gradually increasing vacuum to the column.

With the oil bath still at 180° C., and the vacuum at 10–20 milliliters of mercury, unreacted diethyl carbonate was removed, the packed column having been removed. A total of 1888 grams of distillate (alcohol and carbonate) was collected. Infra-red analysis indicated 56 grams of dioxane therein.

Further reducing the pressure to 8 milliliters mercury and maintaining the bath at 180° C. for 2 hours to remove diethylene glycol, yielded 2424 grams of a linear polycarbonate having a hydroxyl number of 102. Subjecting a 360 gram portion of this product to topping conditions of 165–170° C. and 2 milliliters of mercury pressure for 1.5 hours gave a linear polycarbonate product having a hydroxyl number of 56. The balance was further topped at 165–170° C. and 3 milliliters of mercury pressure for 4 hours to obtain a product having a hydroxyl number of 71.

EXAMPLE IV

Following generally the procedure of Example IV except that the maximum pot temperature was 150° C., gave a distillate (alcohol and diethyl carbonate) of 1892 grams which contained but 9 grams of dioxane as determined by infra-red analysis.

One hundred and fifty gram portions of the product prepared in the above manner were then topped in a 500 milliliter glass flask using an air ebullition tube at 2–3 millimeters mercury for 1 hour at temperatures of 150° C., 165° C., and 180° C. to remove unreacted diethylene glycol. Linear polycarbonates were thereby obtained as listed:

Temperature, ° C.: Hydroxyl No.
150 _____ 96
165 _____ 63
180 _____ 51

Thus, by conducting ester-interchange reactions at maximum temperatures below 180° C., e. g. at 150° C., substantially less dioxane is formed. In addition, products having comparable hydroxyl numbers may be prepared while operating at temperatures below those at which considerable dioxane is formed by removing (topping) unreacted diol from the product at temperatures above 150° C.

The herein described ester-interchange reaction between a diester of carbonic acid and a saturated, acyclic diol is catalyzed by small quantities of alkaline materials, only traces of such materials often being adequate. Such small quantities of catalyst are normally effective that under most circumstances their removal from the final polycarbonate product is not essential. Of the alkaline materials used, metallic sodium finds widest application. Besides metallic sodium, some of the available alkaline catalysts include metallic lithium, metallic calcium, or sodium or potassium carbonate among others. Alkali metal alkoxides such as sodium alkoxide as well as the alkali metal hydrides, e. g. sodium hydride, lithium hydride, or potassium hydride, rubidium hydride and cesium hydride have also been recognized to promote such ester-interchange. Various other alkaline catalysts may also be used. Catalyst concentrations as low as 0.005 percent or less by weight of the reaction mixture are not unusual. Larger catalyst concentrations are operable such as up to about 3 or 5 percent by weight of the reagents.

Among the diesters of carbonic acid which are utilized in connection with the present invention are the normally liquid, saturated aliphatic diesters of carbonic acid, notably dialkyl carbonates among which are diethyl carbonate, diisopropyl carbonate, dipropyl carbonate, dibutyl carbonate, and even higher molecular weight dialkyl carbonates, although those diester carbonates which upon ester-interchange yield a low-boiling monohydric alcohol comprise a preferred sub-class diesters. Alcohols which have normal boiling points below about 120° C., and preferably below about 85° C., are considered low boiling within the preferred requirements of this invention and include as a general rule the monohydric aliphatic alcohols containing up to 5 carbon atoms and sometimes as many as 7 carbon atoms. Mixed diesters of carbonic acid such as ethyl methyl carbonate, methyl isopropyl carbonate and the like may be employed.

Diols which are reacted with the diesters of carbonic acid are the saturated, acyclic (aliphatic, non-cyclic, non-cyclizing) dihydric alcohols including particularly the polyglycols. By the term saturated is meant the absence of olefinic or acetylenic unsaturation; that is the absence of double or triple unsaturation linkages. Acyclic and non-cyclizing diols, as herein intended, are diols having two primary hydroxyl groups linked to carbon atoms which are separated from each other by at least 2 carbon atoms. That is, the hydroxyl groups are separated by a minimum of 4 carbon atoms.

Typical diols include butadiol-1,4-, diethylene glycol, triethylene glycol, tetraethylene glycol, dipropylene glycol, tripropylene glycol, dibutylene glycol, tetrabutylene glycol, and the like. Polyglycols otherwise suitable and containing from 1 to 4 ether linkages and/or up to 12 carbon atoms are included. It is, of course, possible to use mixtures of two or more of these diols to provide a mixed linear polycarbonate, that is a polycarbonate that has radicals derived from more than one diol.

Polycarbonates prepared by practice of this invention are linear, contain terminal hydroxyl groups, have an average molecular weight of between about 800 and 4000 or 5000, or usually between about 1600 and 3000, and have hydroxyl numbers ranging from about 30 to 105 and infrequently as high as 150. They range from free-flowing liquids (low molecular weight, high hydroxyl number products) viscous sirups or solids (high molecular weight, low hydroxyl number products). Particularly desirable linear polycarbonates provided by recourse to this invention are those which have average molecular weights of between 1600 and 3000, have hydroxyl numbers of between 40 and 70 and contain terminal primary hydroxyl groups, preferably to the substantial exclusion of other terminal groups. These polycarbonates presumably have the following general structure:

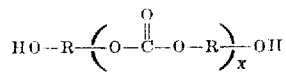

wherein R represents the residue of the saturated, acyclic (aliphatic) diol and X designates the number of repeating units in the molecule. Depending on the particular diol from which R is derived, X varies considerably but is generally a value of from 10 to 50. With diethylene glycol, X is suitably from 12 to 20.

According to a further embodiment, a cyclic process may be provided whereby the evolved alcohol which is removed from the ester-interchange reaction system is utilized to regenerate one of the reagents, the carbonic acid diester. Accordingly, the evolved and uncondensed alcohol which is removed from the system after passing through the packed column, for example, is subjected to phosgenation under those conditions which are conducive to the production of a diester of carbonic acid such as by interreaction of two moles of the alcohol with a mole of phosgene. Such phosgenation is frequently conducted stepwise, first to produce a chloroformate and then to produce the carbonate with consequent evolution of two moles of hydrogen chloride. Various processes for conducting such phosgenation are known, see for example U. S. Patents 1,603,703 and 1,638,014.

Although the present invention has been described with reference to specific details of certain embodiments, it is not intended that the invention be construed as being limited thereto except insofar as described in the appended claims.

I claim:

1. A method of preparing a linear polycarbonate having terminal hydroxyl groups and an average molecular weight between 800 and 5000 which comprises establishing a reaction medium containing a selected mole ratio of an aliphatic diester of carbonic acid and a saturated, acyclic diol, the diol being present in slight mole excess, heating the medium up to as high as about 200° C. whereby to effect ester-interchange and evolve alcohol, removing the evolved alcohol from the reaction medium during the course of the reaction and maintaining the mole ratio of diester to the diol present in the reaction medium essentially constant throughout at least a major portion of the ester-interchange reaction period.

2. A method of preparing a linear polycarbonate having terminal hydroxyl groups, and an average molecular weight between 800 and 5000 which comprises establishing a reaction medium containing an aliphatic diester of carbonic acid and about 1.05 and 1.25 moles of saturated, acyclic diol per mole of diester of carbonic acid, heating the medium up to as high as about 200° C., whereby to effect ester-interchange and evolve alcohol, removing the evolved alcohol during the course of the reaction and maintaining the mole ratio of diol to diester at between 1.05 and about 1.25 essentially throughout the course of the ester-interchange reaction.

3. A method of preparing a linear polycarbonate having terminal hydroxyl groups and an average molecular weight between 800 and 5000 which comprises establishing a reaction medium containing an aliphatic diester of carbonic acid and between about 1.05 and 1.15 moles of saturated, acyclic diol per mole of diester of carbonic acid, heating the medium to a temperature of not over about 200° C., whereby to effect ester-interchange and evolve alcohol, applying a vacuum to the reaction medium to remove the evolved alcohol during the course of the reaction and maintaining the mole ratio of diol to diester in the reaction medium essentially constant throughout at least a major portion of the reaction period.

4. A method of preparing a linear polycarbonate having an average molecular weight between 800 and 5000 which comprises establishing a reaction medium containing between about 1.05 and 1.15 moles of saturated, acyclic diol per mole of dialkyl carbonate, heating the medium to a temperature of about 140° C. and about 200° C. to effect ester-interchange and evolve alcohol, removing the evolved alcohol along with dialkyl carbonate during the course of the reaction, separating the evolved dialkyl carbonate from the alcohol and returning it to the reaction medium whereby to maintain an essentially constant mole ratio of diol to diester therein throughout at least a major portion of the reaction period.

5. A method of preparing a linear polycarbonate having terminal hydroxyl groups and an average molecular weight between 800 and 5000 which comprises establishing a reaction mixture containing an aliphatic diester of carbonic acid and between about 1.05 and about 1.15 moles of saturated, acyclic diol per mole of diester of carbonic acid, heating the medium to a temperature of between about 140° C. and 200° C. whereby to effect ester-interchange and evolve alcohol, applying a vacuum to the system to remove the evolved alcohol from the reaction medium during the course of the reaction along with some diester of carbonic acid, separating the diester from the alcohol and returning it to the reaction medium whereby to provide an essentially constant mole ratio of diol to diester therein throughout at least a major portion of the reaction period.

6. A method of preparing a linear polycarbonate having terminal hydroxyl groups and an average molecular weight between 800 to 5000 which comprises establishing a reaction medium containing between 1.05 and about 1.15 moles of diethylene glycol per mole of diethyl carbonate, heating the medium to a temperature of between 140° C. and about 200° C., whereby to effect ester-interchange and evolve alcohol, applying a vacuum to said medium whereby to remove ethanol along with diethyl carbonate during the course of the reaction, selectively condensing the diethyl carbonate accompanying the removed alcohol and returning said condensate to the reaction medium whereby to maintain an essentially constant mole ratio of diethylene glycol to diethyl carbonate in the reaction medium throughout a major portion of the reaction period.

7. A method of preparing a linear polycarbonate having terminal hydroxyl groups and an average molecular weight between 800 and 5000 which comprises establishing a reaction medium containing about 1.05 and about 1.15 moles of diethylene glycol per mole of diethyl carbonate, gradually heating the medium until a temperature as high as about 200° C. is reached whereby to effect ester-interchange and evolve alcohol, applying a gradually increasing vacuum to the system whereby to remove alcohol as it is evolved as a by-product of the ester-interchange reaction, said removed alcohol being accompanied by diethyl carbonate, separating said diethyl carbonate accompanying the ethanol therefrom and reintroducing said diethyl carbonate to the reaction medium during the course of the reaction whereby to maintain an essentially constant mole ratio of diethylene glycol to diethyl carbonate in the reaction medium throughout a major portion of the reaction period.

8. The method of claim 7 wherein the diethyl carbonate is selectively condensed from the ethanol and continuously returned to the reaction medium.

9. A method of separating components of a mixture of an acyclic diol, an aliphatic diester of carbonic acid and a linear polycarbonate having terminal hydroxyl groups and an average molecular weight between 800 and 5000, the composition of said mixture corresponding to that resulting from ester-interchange between a saturated, acyclic diol and an aliphatic diester of carbonic acid at temperatures up to 200° C. while removing evolved alcohol from the reaction medium during the reaction and maintaining an essentially constant mole ratio of diol to diester in the reaction medium throughout at least a major portion of the reaction, said mole ratio being such that the diol is in slight mole excess, which comprises removing diester of carbonic acid from said mixture while maintaining diol in the mixture throughout said diester removal.

10. A method of separating components of a mixture of an acyclic diol, an aliphatic diester of carbonic acid and a linear polycarbonate having terminal hydroxyl groups and an average molecular weight between 800 and 5000, said mixture having a composition corresponding to that resulting from ester-interchange between a saturated, acyclic diol and an aliphatic diester of carbonic acid at temperatures up to about 200° C. while removing evolved alcohol from the reaction medium during the reaction and maintaining an essentially constant mole ratio of diol to diester, the diol being present in slight mole excess, which comprises removing carbonic acid diester from such mixture by application of heat and vacuum thereto, maintaining diol in said mixture while removing said diester and subsequently removing diol.

11. The method of claim 10 wherein the aliphatic diester of carbonic acid is diethyl carbonate and the diol is diethylene glycol.

References Cited in the file of this patent

UNITED STATES PATENTS

| | | |
|---|---|---|
| 1,995,291 | Carothers | Mar. 26, 1935 |
| 2,370,568 | Muskat et al. | Feb. 27, 1945 |
| 2,563,771 | Adelson | Aug. 7, 1951 |
| 2,651,657 | Mikeska et al. | Sept. 8, 1953 |

FOREIGN PATENTS

| | | |
|---|---|---|
| 650,002 | Great Britain | Feb. 7, 1951 |

UNITED STATES PATENT OFFICE

CERTIFICATE OF CORRECTION

Patent No. 2,787,632                                    April 2, 1957

Henry C. Stevens

It is hereby certified that error appears in the printed specification of the above numbered patent requiring correction and that the said Letters Patent should read as corrected below.

Column 4, line 39, before "pressure" insert --in--; line 54, for "permit" read --permitting--; column 5, lines 69 and 74, for "milliliters" read --millimeters--; column 6, lines 4 and 7, for "milliliters" read --millimeters--; line 12, for "Example IV" read --Example III--; line 66, before "diesters" insert --of--; column 7, line 12, for "butadiol-1,4-" read --butadiol-1,4--; column 8, line 64, claim 6, for "800 to 5000" read --800 and 5000--.

Signed and sealed this 14th day of January 1958.

(SEAL)
Attest:

KARL H. AXLINE
Attesting Officer

ROBERT C. WATSON
Commissioner of Patents